United States Patent
Joulin et al.

(10) Patent No.: US 12,017,344 B2
(45) Date of Patent: Jun. 25, 2024

(54) SUCTION GRIPPER HEAD WITH A FOAM BODY

(71) Applicant: JOULIN CEMMA, Etampes (FR)

(72) Inventors: Laurent Joulin, Issy-les-Moulineaux (FR); Pierre Boulant, Etampes (FR)

(73) Assignee: PIAB AKTIEBOLAG, Danderyd (SE)

( * ) Notice: Subject to any disclaimer, the term of this patent is extended or adjusted under 35 U.S.C. 154(b) by 243 days.

(21) Appl. No.: 17/242,914

(22) Filed: Apr. 28, 2021

(65) Prior Publication Data

US 2021/0331331 A1    Oct. 28, 2021

(30) Foreign Application Priority Data

Apr. 28, 2020  (FR) ..................... 2004205

(51) Int. Cl.
  *B25J 15/06*  (2006.01)
  *B66C 1/02*   (2006.01)

(52) U.S. Cl.
  CPC .......... *B25J 15/0691* (2013.01); *B66C 1/025* (2013.01)

(58) Field of Classification Search
  CPC ... B25J 15/0616; B25J 15/0691; B66C 1/025; B66C 1/0281; B66C 1/0287
  USPC ..................................... 294/188
  See application file for complete search history.

(56) References Cited

U.S. PATENT DOCUMENTS

| | | | | |
|---|---|---|---|---|
| 3,377,096 A | * | 4/1968 | Wood ................... | B66C 1/0231 248/363 |
| 3,640,562 A | * | 2/1972 | Creskoff ............... | B66C 1/0281 248/363 |
| 3,720,433 A | * | 3/1973 | Rosfelder ............. | B66C 1/0243 294/188 |
| 3,796,455 A | * | 3/1974 | Linkbom ............. | B65H 3/0883 271/97 |
| 5,240,299 A | * | 8/1993 | Flavell ................. | B25J 15/0019 294/902 |
| 5,259,859 A | * | 11/1993 | Claassen ............... | C03B 40/005 65/289 |
| 5,464,263 A | * | 11/1995 | Hidetsugu ............. | B66C 1/0281 294/189 |

FOREIGN PATENT DOCUMENTS

| | | | |
|---|---|---|---|
| DE | 2629160 A1 | 1/1978 | |
| DE | 4226822 A1 * | 2/1994 | .......... B25B 11/005 |
| DE | 10316125 B3 | 8/2004 | |
| DE | 102017203939 A1 | 9/2018 | |
| EP | 0325280 A1 | 7/1989 | |
| EP | 2796263 A2 | 10/2014 | |
| FR | 2913414 A1 | 9/2008 | |
| JP | 2004055833 A | 2/2004 | |

\* cited by examiner

*Primary Examiner* — Dean J Kramer
(74) *Attorney, Agent, or Firm* — Muncy, Geissler, Olds & Lowe, P.C.

(57) ABSTRACT

A suction gripper head includes at least one carrier and a soleplate for resting against an item to be lifted. The soleplate is arranged in the bottom portion of the carrier. The head comprises a foam body having a suction path arranged therein between the soleplate and an outlet orifice of the gripper head for connection to a suction block, the foam body thus acting on its own, over at least a portion of the path, to form the separation between air sucked through said path and the outside of the gripper head, such that the air that is being sucked comes directly into contact with the foam of the foam body.

12 Claims, 8 Drawing Sheets

SUCTION GRIPPER HEAD WITH A FOAM BODY

BACKGROUND OF THE INVENTION

Systems are known for gripping and transporting items such as planks, metal sheets, or analogous materials. Such systems comprise a gripper structure fastened to a plate, or mounted to move along said plate, and including a suction gripper head.

In known systems, suction gripper heads comprise a box connected to a suction device, such as an electric pump or turbine, or indeed a vacuum generator using compressed air, such as a Venturi effect vacuum generator.

Whatever the type of suction device, it may be remote from the plate, however that requires pipes of large volume to pass between the gripper head and the remote suction device. Otherwise, the suction device may be incorporated directly in the suction head, but that increases its weight.

Furthermore, both "area" and "spot" gripper heads are known. Unlike spot gripper heads, each of which has a single suction cell, an area gripper head has a plurality of suction cells. Such cells are generally made of flexible elements, such as suction cups or foam.

In contrast, the box of the gripper head carrying such cells needs to be rigid in order to avoid the gripper head being flattened when it is connected to a vacuum. By way of example, such a box may be based on aluminum, on steel, on plastics materials, on composites (carbon, glass fiber, . . . ) . . .

Under such circumstances, in particular when it is the head itself that carries the suction device, it is not uncommon for the gripper head to present weight that is close to the weight of the item that it is to lift, which is not very practical.

This makes it necessary, in particular, either for the user to make use of a gripper system of greater capacity or else to be restricted in the quantity or the type of items to be lifted.

OBJECT OF THE INVENTION

An object of the invention is to propose a suction gripper head of smaller weight.

SUMMARY OF THE INVENTION

In order to achieve this object, the invention provides a suction gripper head comprising at least one carrier and a soleplate for resting against an item to be lifted, the soleplate being arranged in the bottom portion of the carrier.

According to the invention, the carrier comprises a foam body having a suction path arranged therein between the soleplate and an outlet orifice of the gripper head for connection to a suction block, the foam body thus acting on its own, over at least a portion of the path, to form the separation between air sucked through said path and the outside of the gripper head, such that the air that is being sucked comes directly into contact with the foam of the foam body.

As a result, the invention can be lighter than prior art devices by having recourse to a carrier with a foam body forming the air suction path, at least in part.

Advantageously, the foam body also provides the invention with external protection since it is not covered, or at least not in full, by some other component. This means the invention bruises little or not at all.

Throughout the present application, terms such as "bottom", "top" . . . should be understood relative to the position of the gripper head in service when the soleplate is substantially parallel to a horizontal surface.

Optionally, the head includes at least one stiffener element.

Optionally, the head includes a suction block connected to the outlet orifice, the stiffener element being a fastener interface for fastening the suction block to the foam body.

Optionally, the head includes a housing arranged in the foam body to receive the fastener interface, the fastener interface or the housing including a groove for receiving respectively a portion of the housing or a portion of the fastener interface.

Optionally, the stiffener element is a plate or an insert arranged in the bottom portion of the carrier.

Optionally, the stiffener element (and for example the plate or the insert) is arranged at least in part inside the foam body.

Optionally, the stiffener element is a frame.

Optionally, the frame is made up of a plurality of distinct parts.

Optionally, the frame forms a closed outline.

Optionally, at least one of the stiffener elements is a spacer or acts as a spacer, being fastened at each of its ends to two other stiffener elements.

Optionally, the head includes a suction block connected to the outlet orifice, the suction block being arranged at least in part inside the foam body.

Optionally, the head is an area gripper head.

Optionally, a suction block and/or a sound attenuation module is/are arranged at least in part inside the foam body.

Optionally, the soleplate is fastened, at least in part, directly to a bottom face of the foam body.

Optionally, the foam body is shaped in such a manner that the suction path is subdivided in its bottom portion into a plurality of channels with or without balls and/or calibrated holes opening out in register with respective ones of the cells of the soleplate.

The invention also provides a gripper system comprising a gripper structure and a gripper head as specified above.

Other characteristics and advantages of the invention appear on reading the following description of particular, nonlimiting embodiments of the invention.

BRIEF DESCRIPTION OF THE DRAWINGS

The invention can be better understood in the light of the following description given with reference to the accompanying figures, in which.

DETAILED DESCRIPTION OF THE INVENTION

Figure 1:
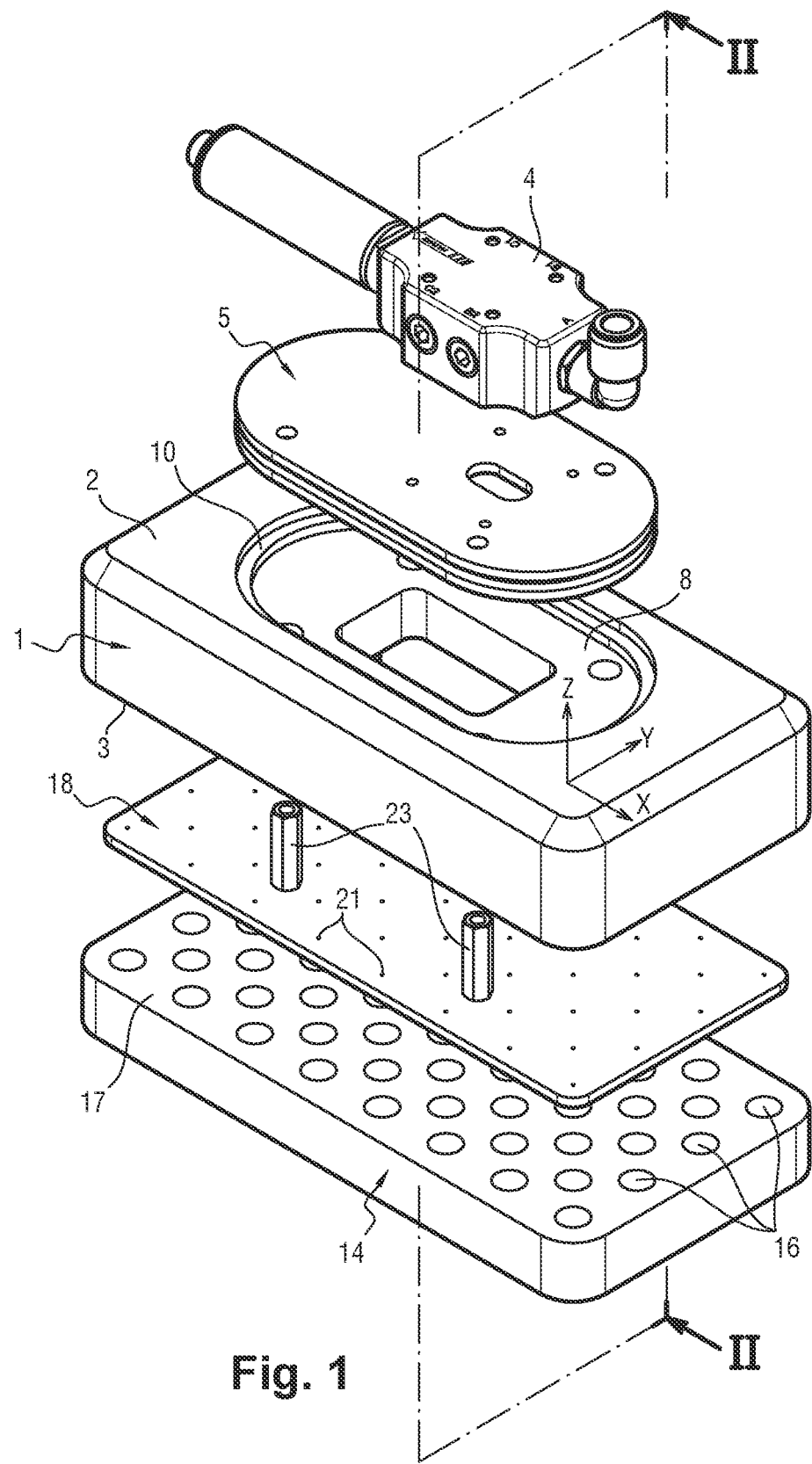
FIG. 1 is an exploded view of a suction gripper head in a first embodiment of the invention.
Figure 2:
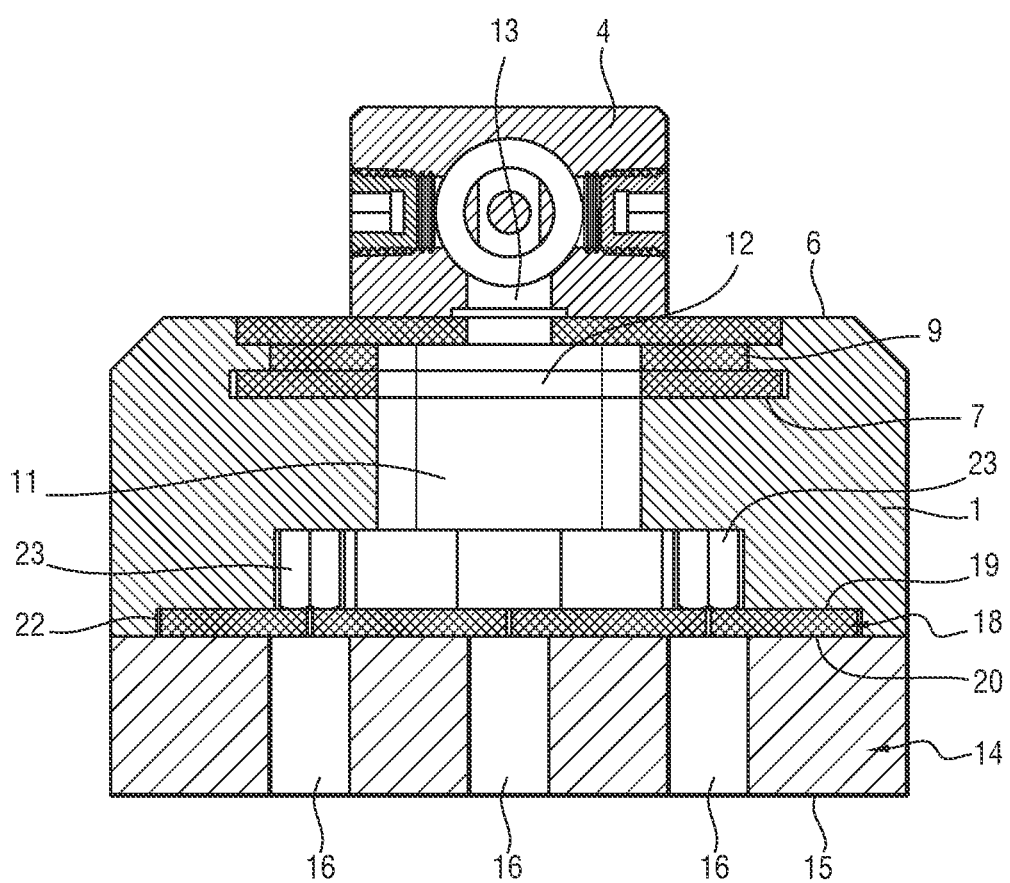
FIG. 2 is a cross-section view of the gripper head shown in FIG. 1.

With reference to FIGS. 1 and 2, the suction gripper head in a first embodiment comprises a carrier, which in this example is constituted entirely by a foam body 1.

The carrier is thus not only leaktight, but also of low density. This makes it possible to reduce the weight of the gripper head.

Externally, said body 1 is generally in the shape of a rectangular parallelepiped. In particular, said body has a plane top face 2 extending in a plane defined by two orthogonal directions X and Y. The body also has an opposite bottom face 3 that is plane and parallel to the top face.

In the present example, in order to be less dangerous for a user, the body 1 is in the shape of a rectangular block in which the edges between each pair of consecutive side faces are formed by sloping planes and/or by rounding, and in which the edges between each side face and the top face are formed by sloping planes and/or by rounding.

Furthermore, the gripper head optionally includes a suction block 4. The suction block 4 is optionally a vacuum generator, such as a compressed air vacuum generator. For example, the vacuum generator is a Venturi effect vacuum generator.

Preferably, the gripper head includes a fastener interface 5 for fastening the suction block 4 to the carrier.

By way of example, the fastener interface 5 is made of plastics material.

The fastener interface 5 is preferably generally in the shape of a plate so as to present small thickness and two main faces: a top face 6 and a bottom face 7. The two faces 6 and 7 are plane and parallel to each other. The two faces 6 and 7 also extend parallel to the top face 2 of the body 1. Optionally, the fastener interface 5 is shaped so as to present a section that is oblong in shape (in a section plane parallel to the two main faces).

In the present example, the suction block 4 is fastened to the top face 6 of the fastener interface 5, which is in turn fastened to the carrier so that the suction block 4 occupies the top portion of the gripper head.

Preferably, the fastener interface 5 is arranged inside the carrier, at least in part, and it is preferably arranged inside the carrier so that it does not project therefrom.

This serves to isolate the fastener interface 5 by means of the foam body 1, thereby limiting any risk of a user being injured by the gripper head.

For this purpose, the body 1 includes a first housing 8 for receiving the fastener interface 5. This first housing 8 extends from the top face 2 of the body 1 into its inside. The first housing 8 is preferably centered in the body 1 relative to both the X and the Y directions.

The first housing 8 is preferably of shape and dimensions similar to the shape and dimensions of the fastener interface 5 so as to provide an assembly that is leaktight. Typically, the first housing 8 has a cross-section (in a section plane parallel to the plane defined by the directions X and Y) that is oblong and of dimensions similar to the dimensions of the fastener interface 5.

Thus, the fastener interface 5 is arranged in such a manner that its top face 6 is substantially level with the top face 2 of the body 1, with the remainder of the fastener interface 5 being housed inside the body 1. Only the top face 6 of the fastener interface 5 is not covered by the foam of the body 1.

In this position, the suction block 4 rests on the top face 6 of the fastener interface 5 so that its own bottom face is level with the top face 2 of the body 1. The suction block 4 thus penetrates little or not at all into the body 1.

Optionally, a groove 9 is formed in the side face of the fastener interface 5 (i.e. in the face connecting together the two main faces 6 and 7 of the fastener interface 5). In this example, said groove 9 is formed all around the periphery of said face. Preferably, said groove 9 is centered in said side face along a direction Z (i.e. the direction that is orthogonal to the two directions X and Y).

In corresponding manner, the first housing 8 includes at least one tongue 10 extending all around the periphery of an inside face of the first housing 8 that faces the side face of the fastener interface 5.

Thus, once the fastener interface 5 is arranged in the first housing 8, the tongue of the first housing 8 becomes housed in the groove of the fastener interface 5.

This enables the foam of the body 1 to be compressed locally at the boundary between the body 1 and the fastener interface 5, thereby making the gripper head more leaktight.

Naturally air must be capable of flowing between the inlet of the suction block 4 and the bottom face 3 of the body 1. For this purpose, a suction path 11 is provided through the body 1 so as to have a bottom portion opening out at a first end in the bottom face 3 of the body 1 and a second end opening out in the bottom of the first housing 8, with the first housing 8 forming the top portion of the suction path.

The suction path 11 extends in a straight line along the direction Z and it is centered in the foam body relative to the directions X and Y.

Nevertheless, in this example, said suction path 11 presents different sections (in section planes parallel to the plane containing the directions X and Y) at different heights taken along said path, with the section becoming smaller on getting closer to the top face 2 of the body 1.

In corresponding manner, the fastener interface 5 includes a suction channel 12 extending between its two main faces 6 and 7 so as to open out at first end in the bottom face 7 level with the bottom of the first housing 8 and so as to open out at a second end in the top face 6 level with the inlet of the suction block 4. The suction channel 12 extends in a straight line along the direction Z. In this example, said channel also presents different sections (in section planes parallel to the plane containing the directions X and Y) at different heights taken along said channel, with a bottom portion (including the first end) being of larger dimensions than the top portion (including the second end). The bottom portion presents height (along the direction Z) that is greater than the height of the second portion. In reality, the bottom portion is centered in the fastener interface relative to the directions X and Y, and it presents a section of shape and dimensions identical to the shape and dimensions of the section of the facing suction path 11 in the bottom of the first housing 8 so as to provide continuity between the suction path 11 and the suction channel 12 at that level. In contrast, the second portion of the suction channel 12 is of smaller dimensions than the first portion and is adapted to provide continuity between the inlet 13 of the suction block 4 and said channel 12.

Preferably, the bottom face of the carrier does not come to bear directly against an item to be lifted. Thus, the gripper head includes a soleplate 14 secured to the body 1 and having a bottom face 15 that is the face for coming directly into contact with the item to be grasped. Said soleplate 14 is preferably made of foam. Nevertheless, in this example, said soleplate 14, which is there only to facilitate gripping an item, should not be confused with the body 1, which is there to form the suction path 11 and to act as a carrier. The body 1 thus needs to provide the gripper head with stiffness, while, conversely, the soleplate 14 is for deforming under the action of suction so as to enhance the adhesion of the item to the gripper head.

In this example, the soleplate 14 is made as a single piece.

In the present example, the soleplate 14 covers the entire bottom face of the body 1.

The soleplate 14 is generally in the shape of a rectangular parallelepiped. More precisely, the soleplate 14 is in the shape of a rectangular parallelepiped in which at least the edges between all of the pairs of consecutive side faces are formed by sloping planes and/or by rounding.

Typically, the gripper head is an area gripper head. The soleplate 14 thus includes a plurality of cells 16 (only some of which are referenced) that are regularly distributed in the soleplate 14.

This makes it possible to apply the gripper head to a greater variety of items to be handled.

In this example, each cell 16 is in the form of a hole extending in a straight line parallel to the direction Z so as to open out at a first end level with the top face 17 of the soleplate 14 and so as to open out at a second end level with the bottom face 15 of the soleplate 14.

The soleplate 14 is preferably not fastened directly to the carrier (or else it is not entirely fastened directly to the carrier), but rather it is fastened to said carrier via a plate 18. Said plate 18 is thus fastened directly to the body 1 via its top face 19 and it is fastened directly to the soleplate via its bottom face 20.

The plate 18 presents a section that is rectangular (in a section plane parallel to the plane containing the directions X and Y).

Said plate 18 preferably presents dimensions that are smaller than the dimensions of the top face 17 of the soleplate 14 and/or of the bottom face 3 of the body 1. Under such circumstances, the soleplate 14 is also fastened directly to the carrier over portions of the bottom face 3 of the body 1 that are not covered by the plate 18. In the present example, this corresponds to fastening around the entire outer periphery of the plate 18 and thus on the entire periphery of the bottom face 3 of the body 1. Having the soleplate 14 overlapping both the plate and the body 1 serves to make the assembly more leaktight.

By way of example, the plate 18 may be based on plastics material.

Naturally, the plate 18 is pierced by calibrated holes 21 (only some of which are referenced), each calibrated hole 21 extending in line with one of the cells 16 in the soleplate 14. The calibrated holes 21 are much smaller in diameter than the cells 16.

In the present example, the plate 18 is arranged at least in part inside the carrier, and it is preferably arranged in full inside the carrier.

This enables the body 1 to isolate the plate 18 from the outside, thereby limiting any risk of injuring a user of the gripper head.

For this purpose, the body 1 includes a second housing 22 for receiving the plate 18. The second housing 22 extends from the bottom face 3 of the body 1 into the inside of the body. The second housing 22 is preferably centered in the body 1 relative to both the X and the Y directions. The second housing 22 is preferably of shape and dimensions similar to the shape and dimensions of the plate 18 so as to provide an assembly that is leaktight. Typically, the second housing 22 has a cross-section (in a section plane parallel to the plane defined by the directions X and Y) that is rectangular and of dimensions similar to the dimensions of the plate.

Thus, the plate 18 is arranged in such a manner that its bottom face 20 is substantially at the same level as the bottom face 3 of the body 1, with the remainder of the plate 18 thus being housed inside the body 1.

In this position, the soleplate 14 thus rests against the bottom face 20 of the plate 18 so that its top face 17 is at the same level as the bottom face 3 of the body 1. The soleplate 14 thus penetrates into the body 1 little or not at all.

Thus, in service, the suction takes place via the suction block 4 through the cells 16 and then along the suction path 11 (initially via the plate 18 and then directly along the suction path 11 and then along the suction channel 12).

Advantageously, the body 1 thus enables suction to be distributed to all of the calibrated holes 21 and thus to all of the cells 16.

Also, the plate 18 serves to stiffen the body 1 since it is incorporated in said body 1.

Furthermore, when the item for handling is of smaller dimensions than the soleplate 14, the cells 16 are not necessarily all covered by the item. The plate 18 then serves to limit leakage via said cells 16 that are not covered.

Preferably, the gripper head includes at least one spacer 23 arranged inside the body in order to limit its deformation. A spacer 23 is a rigid part that connects two other parts together and that holds them apart at a fixed spacing.

In the present example, the spacer 23 of the gripper head is a tube, and by way of example a metal tube.

Preferably, said spacer 23 extends in a straight line parallel to the direction Z so as to limit vertical deformation of the body 1.

By way of example, the body 1 may incorporate 1 to 10 spacers 23, optionally 2 to 8 spacers 23, optionally 3 to 6 spacers 23. In the present example, the body 1 incorporates four spacers 23.

Each spacer 23 extends between the fastener interface 5 and the plate 18. More precisely, each spacer 23 is fastened at a first end to the bottom face 7 of the fastener interface 5, and is fastened at an opposite second end to the top face 19 of the plate 18.

The spacers 23 are regularly distributed inside the body 1. For example, the spacers 23 are arranged at the four corners of the suction path 11 where it has its largest section.

Holes are provided in the body 1 for passing the spacers 23 through said body 1.

Thus, the spacers 23 passing through the body 1, also serve to reduce lateral deformation of said body 1.

Also, the spacers 23 limit any risk of one or more layers of the gripper head being torn out by fastening the fastener interface 5 to the plate 18.

The description above relates to a gripper head that is simple in structure and in which its carrier is made entirely out of foam.

As a result, the suction path 11 through the carrier is defined solely by said body 1 and is thus separated from the outside by said body 1 acting on its own. Furthermore, air is sucked directly through the foam of the body 1 for the portion of the suction path 11 that extends between the plate 18 and the fastener interface 5, i.e. it is only the foam of the body 1 separates the air that is being sucked through the head from the air outside the head (for the bottom portion of the suction path 11 and for its top portion, the air inside said suction path 11 being sucked through the plate 18 and through the fastener interface 5 respectively).

The gripper head as described above is thus found to be smaller in weight compared with prior art devices. Advantageously, because of the body made of foam, such a gripper head serves to limit any risk of injuring the user.

Thus, using foam as a structural element in the gripper head serves to obtain a gripper head that is compact, while also protecting the user in the event of collision.

In the embodiment described, the spacers 23, the plate 18, and the fastener interface 5 serve to stiffen the gripper head, while being internal to said head. Specifically, these various stiffener elements thus enable deformation of the body 1 to be limited, while also serving to conserve a gripper head that is light in weight and not very dangerous in the event of collision.

Figure 3:
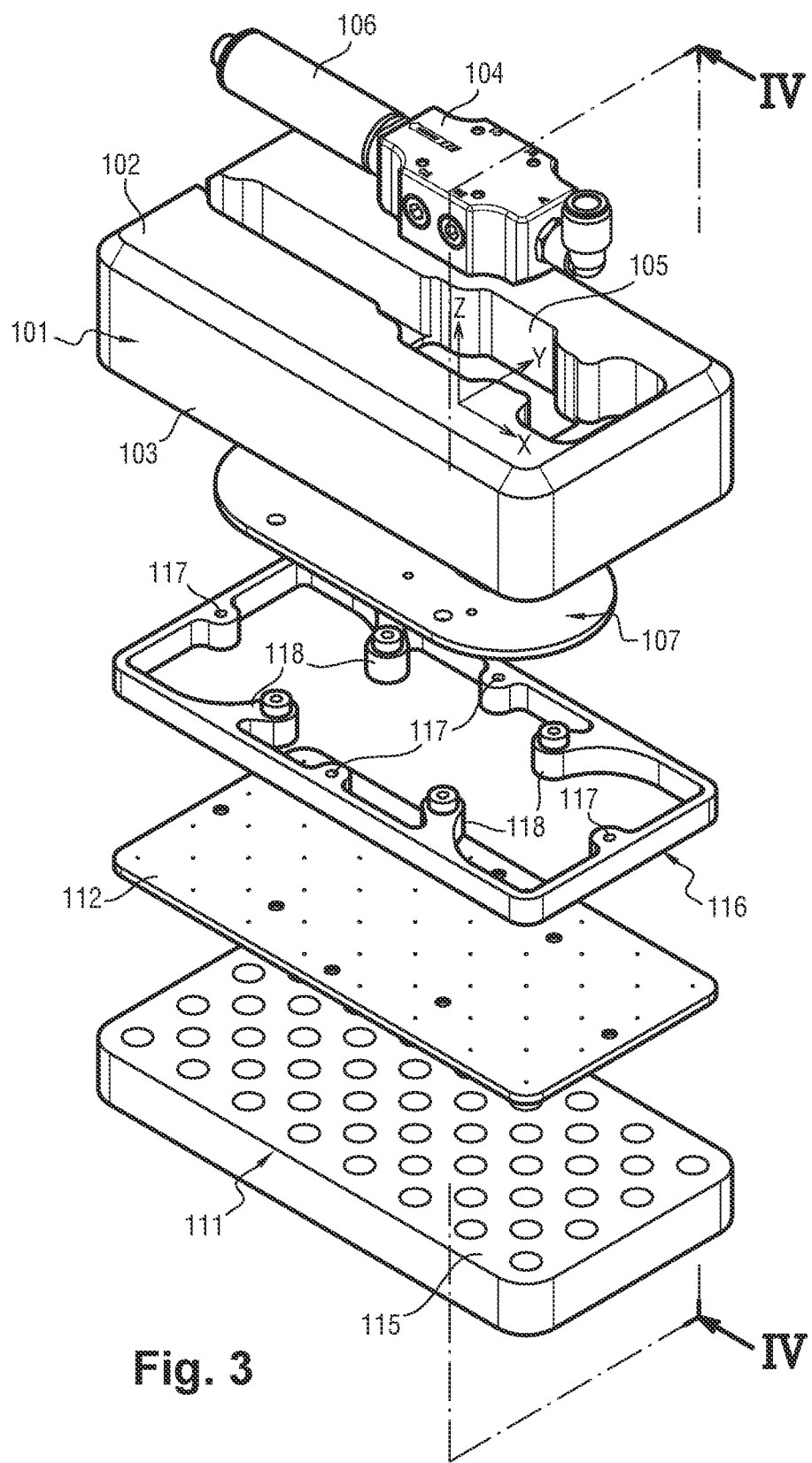
FIG. 3 is an exploded view of a suction gripper head in a second embodiment of the invention.
Figure 4:
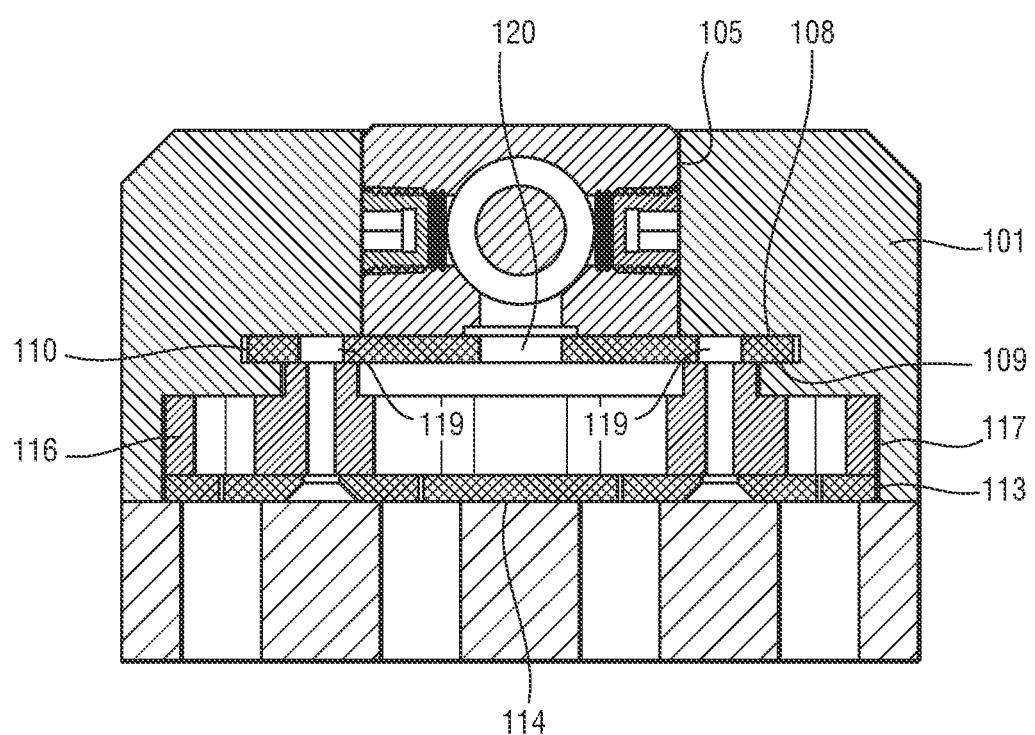
FIG. 4 is a cross-section view of the gripper head shown in FIG. 3.

With reference to FIGS. 3 and 4, the suction gripper head in a second embodiment comprises a carrier, which in this example is constituted entirely by a foam body 101.

The carrier is thus not only leaktight, but also of low density. This makes it possible to reduce the weight of the gripper head.

Externally, said body 101 is generally in the shape of a rectangular parallelepiped. In particular, said body 101 has a plane top face 102 extending in a plane defined by two orthogonal directions X and Y. The body 101 also has an opposite bottom face 103 that is plane and parallel to the top face.

In the present example, in order to be less dangerous for a user, the body 101 is in the shape of a rectangular parallelepiped in which the edges between each pair of consecutive side faces are formed by sloping planes and/or by rounding, and in which the edges between each side face and the top face are formed by sloping planes and/or by rounding.

Furthermore, the gripper head includes a suction block 104. The suction block 104 is optionally a vacuum generator, such as a compressed air vacuum generator. For example, the vacuum generator is a Venturi effect vacuum generator.

Preferably, the suction block 104 is arranged at least in part inside the carrier, and it is preferably arranged inside the carrier so that it does not project therefrom.

This enables the body 101 to isolate the suction block 104 from the outside, thereby limiting any risk of injuring a user of the gripper head.

For this purpose, the body 101 includes a first reception housing 105 for receiving the suction block 104. This first housing 105 extends from the top face 102 of the body 101 into its inside. The first housing 105 is preferably centered in the foam body relative to both the X and the Y directions.

The first housing 105 is of shape and dimensions that are preferably similar to the shape and dimensions of the suction block 104 so as to provide an assembly that is leaktight.

Thus, the suction block 104 is arranged in such a manner that its top face is substantially level with the top face 102 of the body 101, with the remainder of the suction block 104 being housed inside the body 101. Only the top face of the suction block 104 is not covered by the foam of the body 101.

Optionally, a sound attenuation module 106 of the suction block 104, of the silencer type, is also received in the first housing 105.

Preferably, the gripper head includes a fastener interface 107 for fastening the suction block 104 to the carrier.

By way of example, the fastener interface 107 is made of plastics material.

The fastener interface 107 is preferably generally in the shape of a plate so as to present small thickness and two main faces: a top face 108 and a bottom face 109. The two faces 108 and 109 are plane and parallel to each other. The two faces 108 and 109 also extend parallel to the top face 102 of the body 101. Optionally, the fastener interface 107 is shaped so as to present a section that is oblong in shape (in a section plane parallel to the two main faces 108 and 109).

In the present example, the suction block 104 is fastened to the top face 108 of the fastener interface 107, which is in turn fastened to the carrier so that the suction block 104 occupies the top portion of the gripper head.

Preferably, the fastener interface 107 is arranged inside the carrier, at least in part, and it is preferably arranged inside the carrier so that it does not project therefrom. In reality, in this example, the fastener interface 107 is housed in full inside the body 101.

This serves to isolate the fastener interface 107 by means of the body 101, thereby limiting any risk of a user being injured by the gripper head.

For this purpose, the foam body 101 includes a second reception housing 110 for receiving the fastener interface 107. This second housing 110 extends the first housing 105 towards the inside of the body 101. The second housing 110 is preferably centered in the body 101 relative to both the X and the Y directions.

The second housing 110 is preferably of shape and dimensions similar to the shape and dimensions of the fastener interface 107 so as to provide an assembly that is leaktight. Typically, the second housing 110 has a cross-section (in a section plane parallel to the plane defined by the directions X and Y) that is oblong and of dimensions similar to the dimensions of the fastener interface 107.

Preferably, at its top end, the second housing 110 co-operates with the first housing 105 to form a shoulder, and its bottom end it forms a bottom that partially closes said second housing 110. As a result, the second housing 110 forms a groove for receiving the fastener interface 107.

This serves to stiffen the body 101, and also to provide an assembly that is leaktight.

Preferably, the gripper head also includes a soleplate 111 and a plate 112, for which the above description concerning the first embodiment is equally applicable to the second embodiment.

For this purpose, the body 101 includes a third housing 113 for receiving the plate 112. The third housing 113 extends from the bottom face 103 of the body 101 into the inside of the body. The third housing 113 is preferably centered in the body 101 relative to both the X and the Y directions. The third housing 113 is preferably of shape and dimensions similar to the shape and dimensions of the plate 112 so as to provide an assembly that is leaktight. Typically, the third housing 113 has a cross-section (in a section plane parallel to the plane defined by the directions X and Y) that is rectangular and of dimensions similar to the dimensions of the plate 112.

Thus, the plate 112 is arranged in such a manner that its bottom face 114 is substantially at the same level as the bottom face 103 of the body 101, with the remainder of the plate 112 thus being housed inside the body 101.

In this position, the soleplate 111 thus rests against the bottom face 114 of the plate 112 so that its top face 115 is at the same level as the bottom face 103 of the body 101. The soleplate 111 thus penetrates into the body 101 little or not at all.

Preferably, the gripper head includes at least one frame 116 arranged inside the body 101 in order to limit its deformation.

For this purpose, the body 101 includes a fourth housing 117 for receiving the plate 112. This fourth housing 117 extends inside the body 101 so as to connect the second housing 110 to the third housing 113. The fourth housing 117 is preferably centered in the body 101 relative to both the X and the Y directions. The fourth housing 117 is preferably of shape and dimensions similar to the shape and dimensions of the frame 116 so as to provide an assembly that is leaktight.

In the present example, the frame 116 is a frame made of plastics material.

The frame 116 is also of height (along the direction Z) that is greater than the height of the plate 112 or of the fastener interface 107.

The frame 116 thus serves to reduce vertical deformation of the body 101.

The frame 116 is not solid, and is thus hollow in its center. This serves to reduce weight, and naturally also to allow air to pass between the calibrated holes in the plate 112 and the fastener interface 107.

Optionally, and with reference to a section of the frame 116 (in a section plane parallel to the plane containing the directions X and Y), said frame 116 presents an outer outline of a given shape and an inner outline of shape that is identical or similar and of dimensions that are slightly smaller.

In this example, the frame 116 is shaped so that its outer outline is of shape and dimensions that are similar or identical to the shape and the dimensions of the outer outline of the plate 112. In the present example, the frame 116 thus presents an outer outline that is rectangular with rounded corners and of dimensions identical to the dimensions of the outer outline of the plates 112.

Furthermore, in this example, the frame 116 is arranged so as to extend from the plate 112. Thus, each side face of the frame 116 extends one of the side faces of the plate 112 such that the frame 116 forms a top rim for said plate 112.

Since it has four side faces forming vertical uprights whereby the frame 116 follows the outer outline of the body 101, the frame 116 thus enables both vertical and lateral deformation of the body 101 to be reduced.

Optionally, the frame 116 is fastened to the carrier and/or to some other element of the gripper head.

In the present example, the frame 116 is fastened to the plate 112. For example, the frame 116 includes at least one extension 117 extending from the inner outline of the frame 116 towards the inside of the frame so as to pass at least one fastener element (of screw or bolt type) therethrough, which fastener element serves to secure the frame 116 to the plates 112. By way of example, the extension 117 extends from one of the four faces of the inner outline of the frame 116 towards the inside of the frame 116. By way of example, the extension 117 is of the same height (in the direction Z) as the remainder of the frame 116. In the present example, the frame 116 has four extensions 117 that are identical to one another, each extension 117 extending from the center of a respective one of the four faces of the inner outline of the frame 116 towards the inside of the frame 116.

Furthermore, the frame 116 includes at least one arm 118 extending from the inner outline of the frame 116 towards the inside of the frame. By way of example, the arm 118 extends from one of the four faces of the inner outline of the frame 116, between two of the extensions 117, towards the inside of the frame 116.

By way of example, the frame 116 has 1 to 10 arms, optionally 2 to 8 arms, optionally 3 to 6 arms. In the present example, the frame 116 incorporates four arms 118.

In the present example, the four arms 118 are identical to one another: two arms 118 extend from the longitudinal face of the inner outline of the frame 116 from either side of the extension 117 of said face; and the other two arms 118 extend from the longitudinal face of the inner outline of the frame 116 that is opposite thereto from either side of the associated extension 117.

Furthermore, each arm 118 is extended at each of its ends (in the direction Z) by a respective stud 119, so that each arm with its two associated studs 119 forms a spacer that is thus arranged inside the body 101 so as to limit deformation, particularly vertically. A spacer is a rigid part that connects two other parts together and that holds them apart at a fixed spacing.

Preferably, said spacer extends in a straight line parallel to the direction Z so as to limit vertical deformation of the body 101.

Each spacer extends between the fastener interface 107 and the plate 112. More precisely, each spacer is fastened at a first end to the bottom face 109 of the fastener interface 107 (by a first stud 119), and it is fastened at an opposite second end to the top face of the plate 112 (by a second stud 119).

Thus, the frame 116 itself presents a height that is smaller than the distance between the fastener interface 107 and the plate 112. In contrast, its arms 118 present a height that is identical to the distance between the fastener interface 107 and the plate 112 when their studs 119 are taken into account.

Preferably, the studs 119 are made integrally with the associated arms 118.

Optionally, at least one of the arms 118 and/or at least one of the extensions 117 is integral with the remainder of the frame. The spacers are regularly distributed inside the body 101. It should be understood that the spacers nevertheless do not extend all around the frame, but only from points along the two longitudinal faces.

Thus, the spacers passing through the body 101, also serve to reduce lateral deformation of said body 101.

Also, by fastening the fastener interface 107 to the plate 112, these spacers limit any risk of one or more layers of the gripper head being torn out.

Naturally, air must be capable of flowing between the inlet of the suction block 104 and the bottom face 103 of the body 101. For this purpose, a suction path is arranged through the body 101 so as to open out at a first end level with the bottom face 103 of the body 101, and so as to open out at a second end in the bottom of the first housing 105.

The suction path extends in a straight line along the direction Z and it is centered in the body 101 relative to the directions X and Y.

In the present example, the suction path is defined by the second housing 110, the fourth housing 117, and the third housing 113 in succession.

Thus, in this example, said suction path presents different sections (in section planes parallel to the plane containing the directions X and Y) at different heights taken along said path, with the section becoming smaller on getting closer to the top face 102 of the body 101.

In corresponding manner, the fastener interface 107 includes a suction hole 120 thus extending between the two main faces 108 and 109 of the fastener interface 107 so as to open out at a first end in the bottom face 109 level with the hollow portion of the frame 116, and so as to open out at a second end in the top face 108 level with the inlet of the suction block 104.

The description above relates to a gripper head that is simple in structure and in which its carrier is made entirely out of foam.

As a result, the suction path through the carrier is defined solely by said body 101 and is thus separated from the outside by said body 101 acting on its own. Air is also sucked directly through the foam of the body 101 for the portion of the suction path extending between the top face of the frame 116 and the fastener interface 107, i.e. it is only the foam of the body 101 that then separates the air that is being sucked through the head from the air outside the head (specifically, for the bottom portion of the head, air is sucked through the plate 112 and then the frame 116, and for the top portion, air is sucked through the fastener interface 107).

The gripper head as described above is thus found to be smaller in weight compared with prior art devices. Advantageously, because of the body made of foam, such a gripper head serves to limit any risk of injuring the user.

Thus, using foam as a structural element in the gripper head serves to obtain a gripper head that is compact, while also protecting the user in the event of collision.

In the embodiment described, the spacers, the frame 116, the plate 112, and the fastener interface 107 serve to stiffen the gripper head, while being internal to said head. Specifically, these various elements thus enable deformation of the body 101 to be limited, while also serving to conserve a gripper head that is light in weight and not very dangerous in the event of collision.

Figure 5:
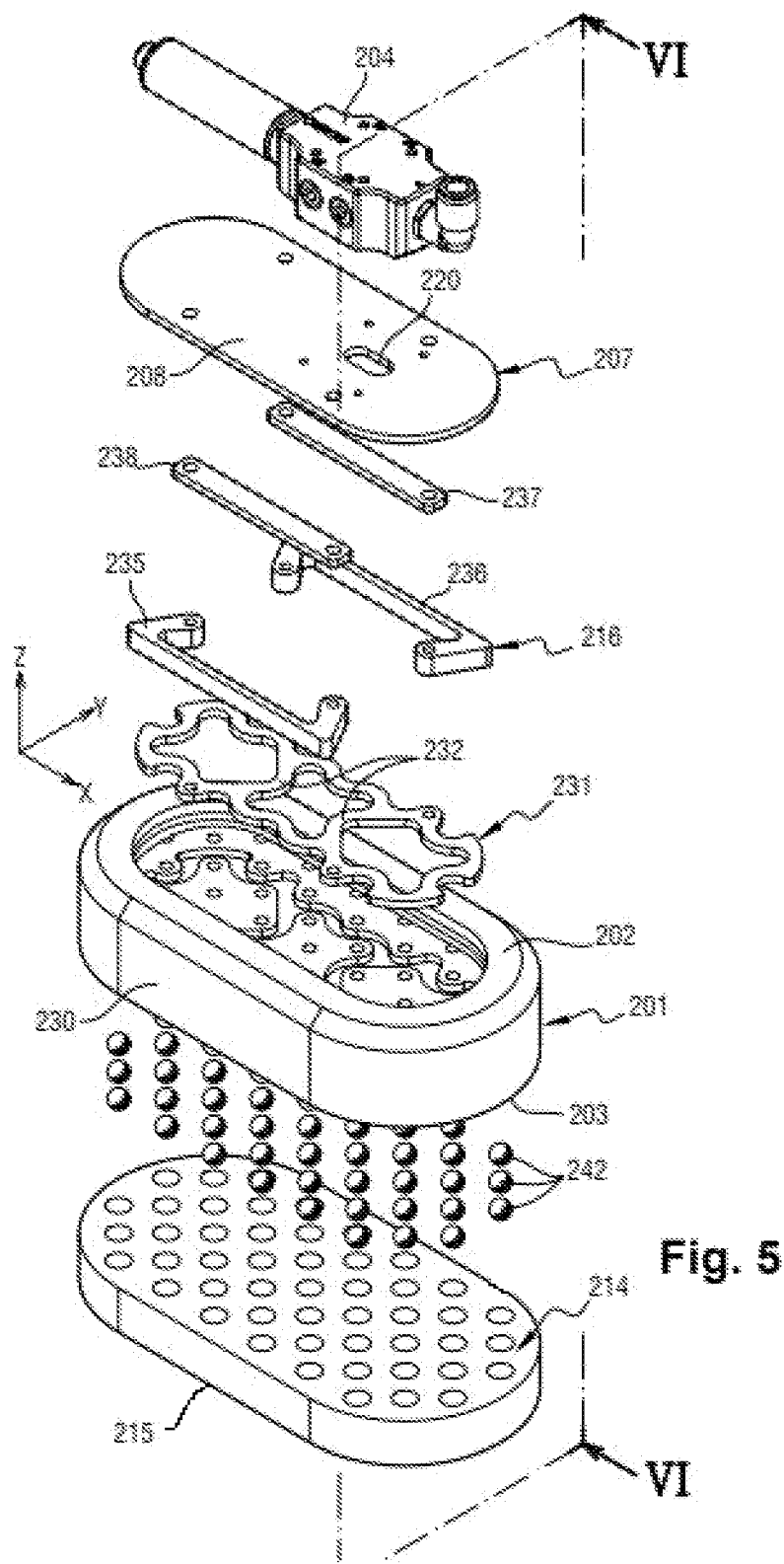
FIG. 5 is an exploded view of a suction gripper head in a third embodiment of the invention.
Figure 6:
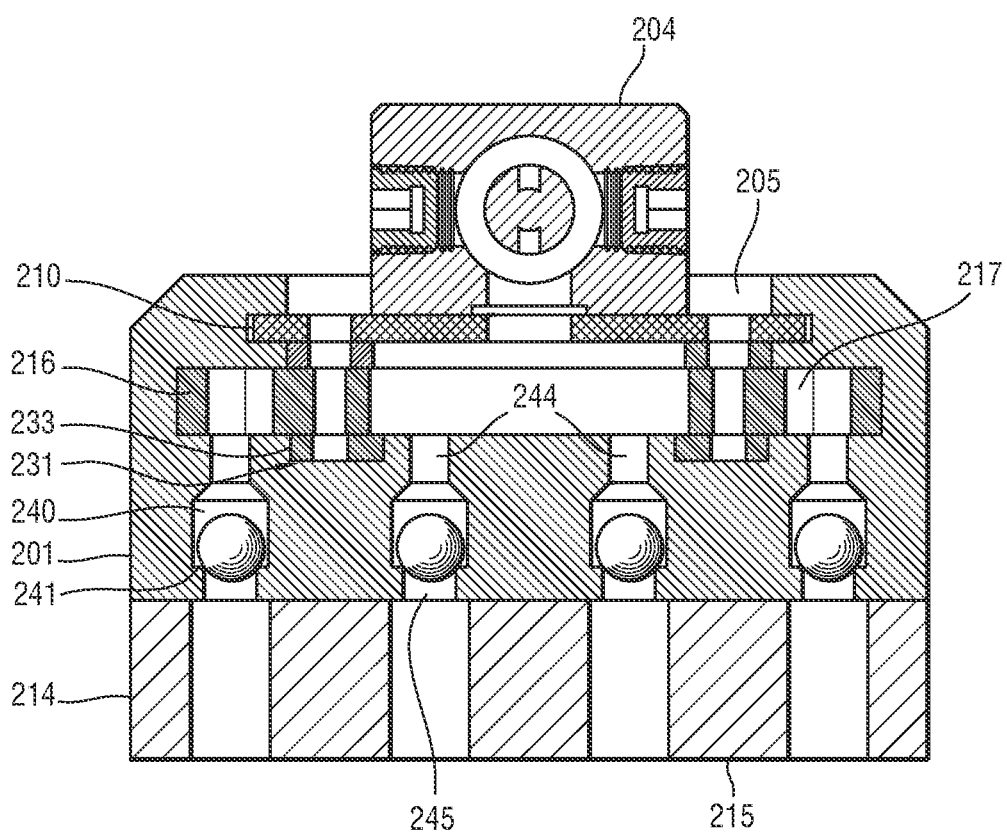
FIG. 6 is a cross-section view of the gripper head shown in FIG. 5.

With reference to FIGS. 5 and 6, the suction gripper head in a third embodiment comprises a carrier, which in this example is constituted entirely by a foam body 201.

The carrier is thus not only leaktight, but also of low density. This makes it possible to reduce the weight of the gripper head.

Externally, said body 201 presents a shape that is generally oblong. In particular, said body 201 has a plane top face 202 extending in a plane defined by two orthogonal directions X and Y. The body 201 also has an opposite bottom face 203 that is plane and parallel to the top face 202, the top and bottom faces being connected together by a side face 230 of oblong section.

The oblong shape of the body 201 provides better distribution of stresses within the carrier and thus limits deformation of said carrier, in particular at the two rounded longitudinal ends of the body 201.

In the present example, in order to be less dangerous for a user, the body 201 is shaped so that at least the edge between the side face 230 and the top face 202 is formed by a sloping plane and/or by rounding.

Furthermore, the gripper head includes a suction block 204. The suction block 204 is optionally a vacuum generator, such as a compressed air vacuum generator. For example, the vacuum generator is a Venturi effect vacuum generator.

Preferably, the suction block 204 is arranged in part inside the carrier.

This enables the body 201 to isolate the suction block 204 in part from the outside, thereby limiting any risk of injuring a user of the gripper head.

For this purpose, the body 201 includes a first reception housing 205 for receiving the suction block 204. This first housing 205 extends from the top face 202 of the body 201 into its inside. The first housing 205 is preferably centered in the foam body 201 relative to both the X and the Y directions.

Thus, the suction block 204 is arranged so that only its bottom portion is housed inside the body 201.

Preferably, the gripper head includes a fastener interface 207 for fastening the suction block 204 to the carrier. In this example, said fastener interface 207 is identical to the fastener interface of the second embodiment.

As in the second embodiment, the suction block 204 is fastened to the top face 208 of the fastener interface 207, which is in turn fastened to the carrier so that the suction block 204 occupies the top portion of the gripper head.

Preferably, the fastener interface 207 is arranged inside the carrier, at least in part, and it is preferably arranged inside the carrier so that it does not project therefrom. In reality, in this example, the fastener interface 207 is housed in full inside the body 201.

This serves to isolate the fastener interface 207 by means of the body 201, thereby limiting any risk of a user being injured by the gripper head.

For this purpose, the foam body 201 includes a second reception housing 210 for receiving the fastener interface 207. This second housing 210 extends the first housing 205 towards the inside of the body 201. The second housing 210 is preferably centered in the body 201 relative to both the X and the Y directions.

The second housing 210 is preferably of shape and dimensions similar to the shape and dimensions of the fastener interface 207 so as to provide an assembly that is leaktight. Typically, the second housing 210 has a cross-section (in a section plane parallel to the plane defined by the directions X and Y) that is oblong and of dimensions similar to the dimensions of the fastener interface 207.

Preferably, at its top end, the second housing 210 co-operates with the first housing 205 to form a shoulder, and its bottom end it forms a bottom that partially closes said second housing 210. As a result, the second housing 210 forms a groove for receiving the fastener interface 207.

This serves to stiffen the body 201, and also to provide an assembly is leaktight. The gripper head includes a soleplate 214 secured to the body 201 and having a bottom face 215 that is the face for coming directly into contact with the item to be grasped.

Overall, the section of the soleplate 214 is identical to the section of the body 201, and it thus presents an oblong section identical to that of the body.

Apart from this oblong shape, the soleplate 214 is identical to the description of the second embodiment.

Preferably, the gripper head includes at least one insert 231 serving to stiffen the body 201.

The insert 231 presents a section (in a section plane parallel to the plane containing the axes X and Y) that is of closed outer outline and that is generally rectangular.

The insert 231 is preferably not solid, and is thus hollow in its center. This enables its weight to be reduced.

Nevertheless, the insert 231 preferably presents at least one link bar 232 between its two longitudinal sides. The insert 231 has 1 to 4 bars, and in the present example it has 2 bars 232.

By way of example, the insert 231 is based on plastics material.

In the present example, the insert 231 is arranged at least in part inside the carrier, and it is preferably arranged in full inside the carrier.

For this purpose, the body 201 includes a third housing 233 for receiving the insert 231. This third housing is arranged entirely inside the body 201. The third housing 233 is preferably centered in the body 201 relative to both the X and the Y directions. The third housing 233 is preferably of shape and dimensions similar to the shape and dimensions of the insert 231 so as to provide an assembly that is leaktight. Typically, the third housing 233 has a cross-section (in a section plane parallel to the plane defined by the directions X and Y) that is of shape and dimensions identical to the shape and dimensions of the insert 231.

Preferably, the gripper head also includes a frame 216 arranged inside the body 201 in order to limit its deformation.

For this purpose, the body 201 includes a fourth housing 217 for receiving the frame 216. This fourth housing 217 extends inside the body 201 so as to connect the third housing 233 to the second housing 210. The fourth housing 217 is preferably centered in the body 201 relative to both the X and the Y directions.

In the present example, the frame 216 is a frame made of plastics material.

The frame 216 is also of height (along the direction Z) that is greater than the height of the plate 231 or of the fastener interface 207.

The frame 216 thus serves to reduce vertical deformation of the body 201.

In the present example, the frame 216 is made up of at least two parts, and specifically it is made up of exactly two distinct parts 235 and 236 that are not directly secured to each other.

By way of example, each part 235 and 236 presents a central rod that is extended at each of its ends up by a respective extension. These two extensions extend substantially towards each other and towards the center of the part in question.

Thus, in a section of each part (in a section plane parallel to the plane containing the directions X and Y), said part presents overall a U-shape with its branches sloping towards the inside of the U-shape. Naturally, this shape is not limiting and the branches could be at right angles.

Nevertheless, the extensions are of length that is shorter than the length of the associated rod.

Each of the parts 235 and 236 presents the same height between the extensions and the rods.

Each part 235, 236 is arranged in the body 201 in such a manner that the two rods extend substantially parallel to each other and the extensions of each of the parts extended towards the other part. The extensions thus extend towards the center of the body 201.

In the present example, the parts 235 and 236 are arranged in such a manner that the rods extend parallel to one of the longitudinal sides of the body 201.

This serves to limit deformation of the sides of the body 201.

Furthermore, the parts 235 and 236 are in contact with the insert 231.

Optionally, each part 235, 236 is fastened in independent manner to the carrier and/or to some other element of the gripper head. In the present example, each part 235, 236 is fastened to the insert 231.

For example, each part 235, 236 is fastened to the insert 231 at the free ends of each of its extensions.

Also, the gripper head includes at least one shim associated with the frame 216. In the present example, the gripper head has a respective shim associated with each of the parts of the frame 216.

In this example, the shims 237 and 238 are shaped so as to fill in the space between the parts 235 and 236 and the fastener interface 207. The shims are independent parts that are not secured directly to each other. In this example, each of the shims 237 and 238 is shaped as a straight bar.

The shims 237 and 238 are arranged so as to extend parallel to each other. The shims 237 and 238 are also arranged so as to extend parallel to the rods of the parts 235 and 236.

Typically, each shim 237, 238 presents a length that is substantially identical to the distance between the free ends of the two extensions of the part with which the shim is associated.

In this example, the shims 237 and 238 are fastened both to the fastener interface 207 and also to the frame 216. More particularly in this example, the shims 237 and 238 are fastened at their free ends both to the bottom face of the fastener interface 207 and also to the free ends of the extensions of the part with which the shim in question is associated.

By way of example, the shims 237 and 238 are made of plastics material.

In this way, the assembly formed by the frame 216 and the shims 237 and 238 forms a spacer that is thus arranged inside the body 201 so as to limit deformation, in particular vertically. A spacer is a rigid part that connects two other parts together and that holds them apart at a fixed spacing.

Preferably, said spacer extends in a straight line parallel to the direction Z so as to limit vertical deformation of the body 201.

Each spacer extends between the fastener interface 207 and the insert 231. More precisely, each spacer is fastened at a first end to the bottom face of the fastener interface 207 (by the shims 237, 238) and at an opposite second end to the top face of the insert 231 (by the frame 216).

Thus, the frame 216 itself presents a height that is smaller than the distance between the fastener interface 207 and the insert 231.

The spacers are regularly distributed inside the body 201. Nevertheless, it should be understood that the spacers do not extend over the entire inner periphery of the body 201, but only along its two longitudinal faces.

Thus, the spacers passing through the body 201, also serve to reduce lateral deformation of said body 201.

Also, by fastening the fastener interface 207 to the insert 231, the spacers limit any risk of one or more layers of the gripper head being torn out.

Naturally, air must be capable of flowing between the inlet of the suction block 204 and the bottom face 203 of the body 201.

For this purpose, the bottom portion of the body 201 includes a plurality of chambers 240 (only one of which is referenced), which chambers are arranged in the body 201, each having a seat 241 receiving a ball 242 so that together they form check valves. In addition, first channels 244 are also arranged in the body 201 so as to open out at a first end in the bottom of the fourth housing 217 and so as to open out at a second end in the top portions of corresponding ones of the chambers 240 above the check valves. Furthermore, second channels 245 are also arranged in the body 201 so as to open out at a first end into the bottom portions of respective ones of the chambers 240 below the check valves and so as to open out at a second end into respective ones of the cells in the soleplate 214. The various chambers 240 are identical to one another and/or the various balls 242 are identical to one another and/or the various first channels 244 are identical to another and/or the various second channels 245 are identical to one another. The various channels 244 and 245 have a section of diameter smaller than the diameter of the chambers 240, with the balls of the check valves being inserted into the chambers 240 via the second channels 245 by deforming the foam of the body 201 locally.

The chambers 240 and the associated channels are thus regularly distributed over the entire bottom portion of the body 201. The general direction of each chamber and of its two associated channels thus extends parallel to the direction Z.

Thus, a suction path is arranged through the body 201. In the present example, this suction path is defined in its top portion by the second housing 210 and the fourth housing 217 in succession, and in its bottom portion by the first channels 244, the chambers 240, and the second channels 245 in succession.

The suction path extends in a straight line along the direction Z and it is centered in its top portion in the body 201 relative to the directions X and Y.

Thus, in this example, said suction path presents a single passage in its top portion presenting different sections (in section planes parallel to the plane containing the directions X and Y) at different heights taken along said path, with the section becoming smaller on getting closer to the top face 202 of the body 201. Furthermore, the suction path presents a plurality of passages in its bottom portion further including check valves.

In corresponding manner, the fastener interface 207 includes a suction hole 220 thus extending between the two main faces 208 and 209 of the fastener interface 207 so as to open out at a first end in the bottom face 209 level with the separation between the two parts 235 and 236 of the frame 216, and so as to open out at a second end in the top face 208 level with the inlet of the suction block 204.

The insert 231 is shaped so as to avoid impeding the flow of air through the chambers 240 and the channels 244 and 245. In this example, the inner and outer outlines of the insert 231 thus present convolutions for going round said chambers and channels.

The description above relates to a gripper head that is simple in structure and in which its carrier is made entirely out of foam.

As a result, the suction path through the carrier is defined solely by said body 201 and is thus separated from the outside by said body 201 acting on its own. Air is also sucked directly through the foam of the body 201 for the portion of the suction path that extends between the bottom face 203 of the body 201 as far as the bottom of the second housing 210, i.e. in that portion it is only the foam of the body 201 that separates the air that is being sucked through the head from the air outside the head (the air subsequently being sucked through the fastener interface 207).

The gripper head as described above is thus found to be smaller in weight compared with prior art devices. Advantageously, because of the body made of foam, such a gripper head serves to limit any risk of injuring the user.

Thus, using foam as a structural element in the gripper head serves to obtain a gripper head that is compact, while also protecting the user in the event of collision.

In the embodiment described, the frame 216, the insert 231 and the shims 237 and 238, and the fastener interface 207 serve to stiffen the gripper head, while being inside said head. Specifically, these various elements thus enable deformation of the body 201 to be limited, while also serving to conserve a gripper head that is light in weight and not very dangerous in the event of collision.

Also, said head includes a check-valve compartment with chambers 240 that are arranged directly in the foam body 201. This makes it possible to have a check-valve head that is simple in structure. In addition, using the body 201 to provide chambers 240 for the check valves serves to make the assembly more leaktight as a result of the foam shrinking locally around the balls while a vacuum is being applied.

This also enables the head to be lighter in weight than in the first and second embodiments.

Naturally, the invention is not limited to the embodiments described above, and variant embodiments may be provided without going beyond the ambit of the invention.

Figure 7:
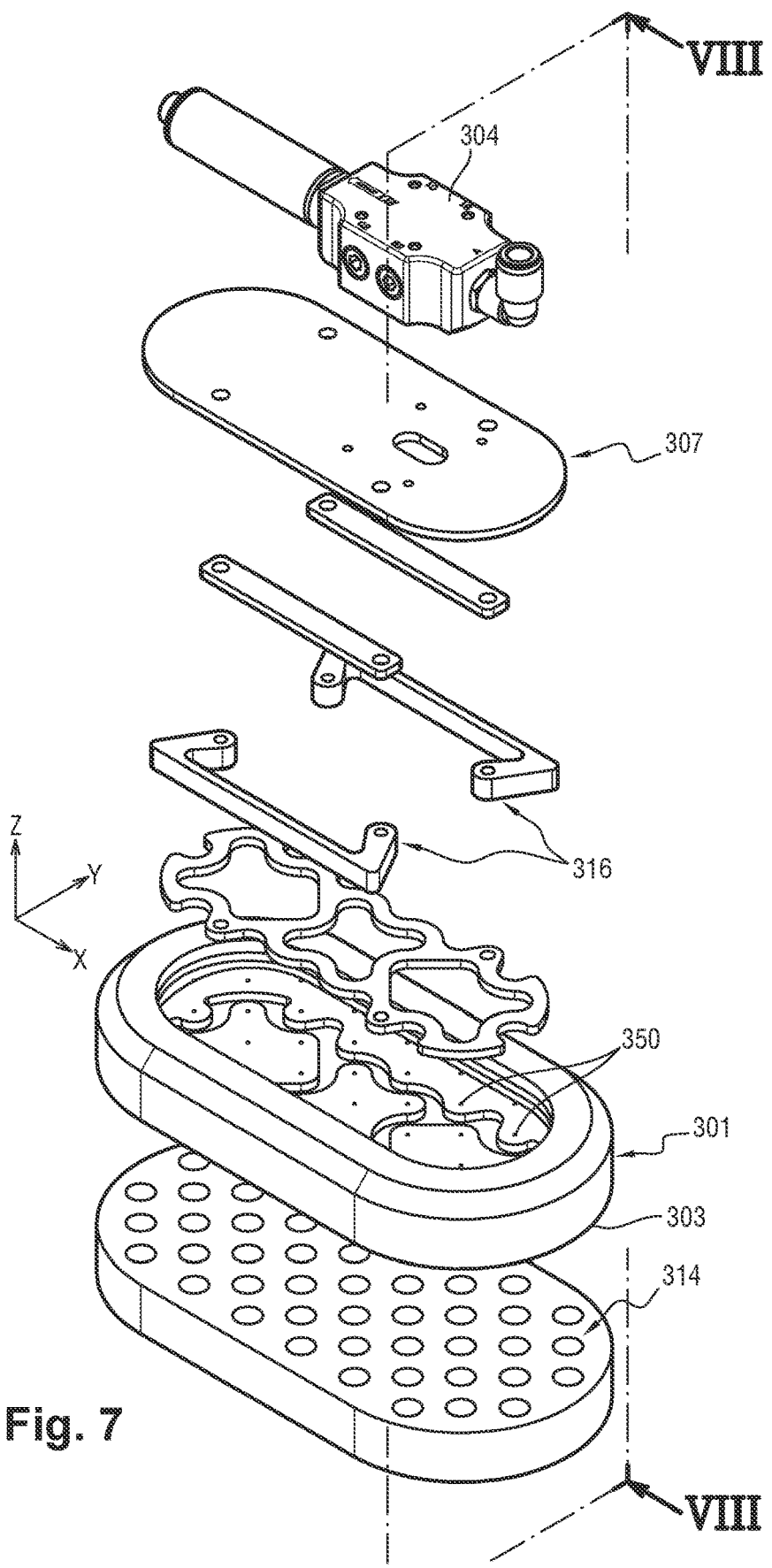
FIG. 7 is an exploded view of a suction gripper head in a fourth embodiment of the invention.
Figure 8:
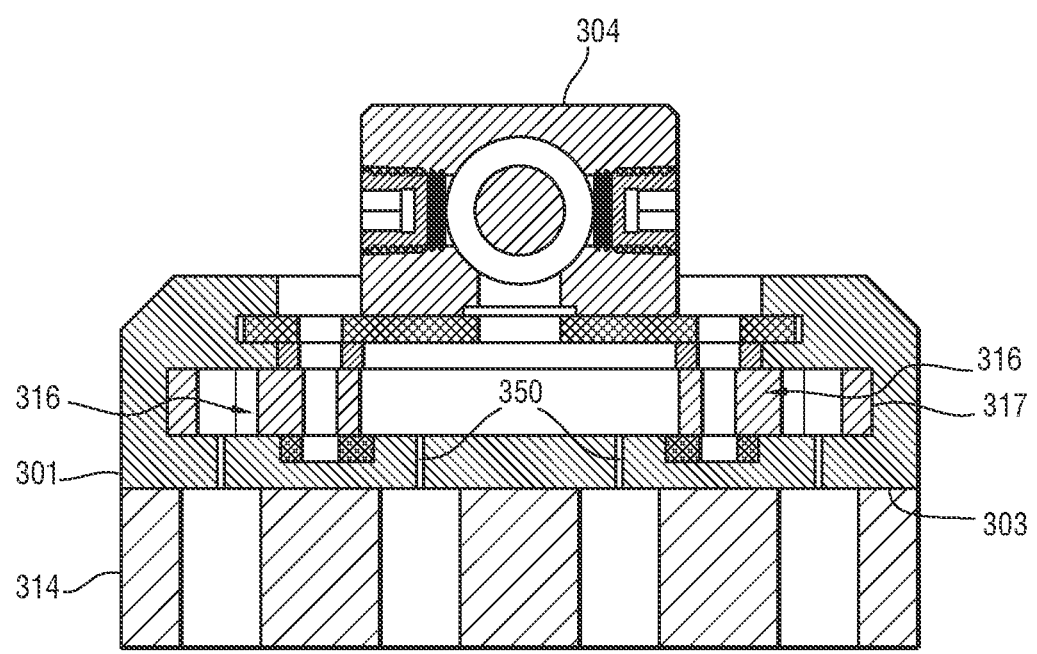
FIG. 8 is a cross-section view of the gripper head shown in FIG. 7.

In particular, it is naturally possible to combine the various embodiments described with one another. By way of example, and with reference to FIGS. 7 and 8, it is thus possible in a fourth embodiment to have a gripper head that is identical to the head of the third embodiment, except that said head does not include a check-valve compartment. Thus, instead of the channels and the chambers, calibrated holes 350 (only some of which are referenced) are arranged in the bottom portion of the body 301 so as to open out at a first end in the bottom of the fourth housing 317 receiving the frame 316, and so as to open out at a second end in the bottom face 303 of the body 301. Each calibrated hole 350 extends in line with a respective one of the cells of the soleplate 314, with the calibrated holes 350 being of diameter that is much smaller than the diameter of the cells. In a variant, the body 301 need not present such calibrated holes, but rather it includes a plate, itself presenting such calibrated holes as in the first embodiment or the second embodiment. Said plate could then be additional to or a replacement for the insert.

In the third embodiment as in the fourth embodiment, the foam body thus also connects vacuum individually to each cell of the soleplate, unlike the first and second modes where this is done by the plate.

Also, said head includes a check-valve compartment with chambers 240 that are arranged directly in the foam body 201. This makes it possible to have a check-valve head that is simple in structure. In addition, using the body 201 to provide chambers 240 for the check valves serves to make the assembly more leaktight as a result of the foam shrinking locally around the balls while a vacuum is being applied.

It is possible to envisage other combinations of embodiments such as arranging a frame in the head of the first embodiment; not arranging a frame in the second or third or fourth embodiment, e.g. by using the spacers of the first embodiment; shaping the foam body of the first or second or fourth embodiment so as to form a check-valve compartment as in the third embodiment . . . ; replacing the plate by the insert and vice versa (the insert then possibly being in contact with the soleplate and/or the plate then being arranged inside the body without being in contact with the soleplate); the bodies of the first or second embodiments could be oblong in shape like the third or fourth embodiments, and vice versa. The vacuum generator could form part of or be separate from the gripper head. Thus, the suction block need not itself include the vacuum generator, but could be connected to a vacuum generator that is remote from the gripper head. This enables the capacity of the gripper head to be increased, while conserving relatively light weight for the gripper head. The gripper head need not include a suction block, but could include only an outlet orifice through which a remote suction block and/or a remote vacuum generator are connected.

Furthermore, although above the gripper head is an area gripper head, the head could be a spot gripper head, i.e. it could present only one cell.

Although above the vacuum generator is a Venturi effect vacuum generator, any other type of vacuum generator could be used, e.g. such as a turbine or a pump.

The fastener interface could be fastened to the carrier without being arranged in part or in full inside the foam body.

A fastener interface and/or a fastener plate for fastening the soleplate to the carrier could be omitted.

The plate could be arranged in part or in full inside the foam body, or it could be arranged entirely outside the foam. The plate need not include any calibrated hole, and could thus serve merely to stiffen the carrier. In addition to or as a replacement for the plate, the head could include some other member for fastening the soleplate to the carrier, such as a check-valve compartment, or such a fastener member could be omitted, with the soleplate then being fastened directly to the foam body of the chamber as in the third and fourth embodiments.

Furthermore, the foam of the body and the foam of the soleplate could be different or identical. The gripper head need not have a soleplate. The soleplate need not cover the entire bottom face of the foam body, but could cover only a portion.

Although above the foam body is a single piece, said body could be made up of a plurality of foam blocks secured to one another, e.g. by adhesive, by screw-type fastener elements, . . . The foam blocks could be assembled together vertically, horizontally, or in other directions.

In the same manner, although above the soleplate is a single piece, the soleplate could be made up of a plurality of foam blocks secured to one another, e.g. by adhesive, by screw-type fastener elements . . . The foam blocks could be assembled together vertically, horizontally, or in other directions.

Furthermore, although above the foam body and the soleplate are distinct, the foam body and the soleplate could comprise a single piece: the cells could thus be made directly in the bottom portion of the foam body (the foam body also including check-valve chambers or else not having any such chambers). If the foam body is shaped so as to present check valves, that arrangement could be different from that described above, e.g. in such a manner as to form a coil for said check valves to close in cascade. Likewise, the frame or any other stiffener element could be arranged differently from the above description, e.g. so as to form a coil for said check valves to close in cascade.

The carrier, and in particular the foam body, could be fastened to other parts of the gripper head, e.g. by adhesive or by any other means.

The shape of the foam body could be other than that described. For example, the foam the body could include at least one connection for connecting the suction block to a general gripper system; a sound attenuation module . . . The foam body could be shaped also to cover the top of the suction block, or indeed the top of the fastener interface.

Although above the gripper head always has a plurality of stiffener elements (as constituted by the plates, the fastener interface, the spacers, the frame, the insert, the shims, . . . ), the gripper head could have some other number of stiffener elements, and for example only one element, or indeed no stiffener element. The gripper head thus need not include a plate and/or a fastener interface and/or a spacer and/or a frame and/or an insert and/or shims . . . . The gripper head preferably includes at least one stiffener element arranged in the foam body in a zone that is subjected to deformation, and preferably at least in the zone that is subjected the most to deformation.

Preferably, the stiffener element(s) is/are incorporated in the foam body in such a manner as to project little or not at all.

Furthermore, although above the various stiffener elements are made of plastics material (e.g. out of polymethyl methacrylate (PMMA) or any other plastics material), one or more of said elements could be made of some other material, and for example out of metal, out of composite material (based on carbon fibers, on glass fibers, . . . ) . . . Preference should be given to materials that are light in weight and rigid.

The foam of the foam body could be based on or made of polyethylene (PE), ethylene vinyl acetate (EVA), polyurethane (PU), polyester, elastomer (e.g. based on or made of rubber), polymer . . . or any other material that preferably has a cellular structure (with cells that may be closed, semi-open, open . . . ) and preferably a cellular structure with cells that are closed.

Also, if the gripper head includes at least one stiffener element, it could be different from the description above. For example, instead of a spacer (i.e. a tubular part), any other rigid part of could be used for connecting together two other stiffener elements in the gripper head and for holding them a fixed distance apart. For example, the frame itself would form a spacer if it is of a height that is sufficient to enable it to be fastened both to the plate and also to the fastener interface. Recourse may also be had to at least one stiffener peg and/or to at least one stiffener rod and/or to at least one vertical stiffener upright . . . The head could thus include one or more vertical uprights fastened on one or more faces of the plate. The plate and/or the insert and/or the frame . . . could directly incorporate one or more vertical uprights so as to be in the form of a tray of vertical uprights.

The fastener interface and/or its housing could be different from the description above. For example, the housing need not include a tongue (the interface would then either not have a groove, or else would have a groove into which the foam body becomes received naturally in the event of suction). The housing for receiving the fastener interface need not be shaped as a groove for receiving the fastener interface.

The plate and/or its housing could be of a shape other than that described. For example, although above the plate is solid (apart from the calibrated holes), said plate could be machined to have one or more openings in order to reduce its weight. Likewise, the plate need not have any calibrated holes.

Similarly, the frame and/or its housing could be different from the above description. For example the frame need not be completely hollowed out in its center, and it could include at least one central structure for further stiffening the gripper head. For example, the frame need not form an entire inner outline of the foam body.

As mentioned above, the frame could be made up of a plurality of parts optionally assembled with one another in part or in full, or it may be a single piece. The part(s) could be of a shape other than that described, and for example they could be in the form of vertical uprights or indeed they could form a closed outline running along the various lateral sides of the body.

Similarly, the shims could be of a shape other than that described. The shims could be integral with the frame.

Although above the frame and/or the spacers and/or the shims are parts that are distinct from the fastener interface and/or the plate and/or the insert, it is possible for the frame and/or at least one of the spacers and/or at least one of the shims to be integral with the fastener interface and/or the plate and/or the insert. This would serve to reduce the number of parts in the gripper head and/or to facilitate assembly of said head and/or to reduce the weight of said head and/or to add reinforcement for stiffening the assembly in given zones.

The invention claimed is:

1. A suction gripper head comprising:
   at least one carrier and a soleplate for resting against an item to be lifted, the soleplate being arranged at a bottom portion of the carrier;
   a foam body having a suction path arranged therein between the soleplate and an outlet orifice of the gripper head for connection to a suction block, the foam body thus acting on its own, over at least a portion of the path, to form a separation between air sucked through said path and outside of the gripper head, such that the air that is being sucked comes directly into contact with a foam of the foam body; and
   at least one stiffener element being arranged at least in part inside the foam body,
   wherein at least one of the stiffener elements is a spacer or acts as a spacer, being fastened at each of its ends to two other stiffener elements.

2. A suction gripper head comprising:
   at least one carrier and a soleplate for resting against an item to be lifted, the soleplate being arranged at a bottom portion of the carrier;
   a foam body having a suction path arranged therein between the soleplate and an outlet orifice of the gripper head for connection to a suction block, the foam body thus acting on its own, over at least a portion of the path, to form a separation between air sucked through said path and outside of the gripper head, such that the air that is being sucked comes directly into contact with a foam of the foam body;
   at least one stiffener element, wherein the suction block is connected to the outlet orifice, the stiffener element is a fastener interface for fastening the suction block to the foam body; and
   a housing arranged in the foam body to receive the fastener interface, the fastener interface or the housing including a groove for receiving respectively a portion of the housing or a portion of the fastener interface.

3. The suction gripper head according to claim 2, wherein the stiffener element is a plate or an insert arranged in the bottom portion of the carrier.

4. The suction gripper head according to claim 2, wherein the stiffener element is a frame.

5. The suction gripper head according to claim 4, wherein the frame is made up of a plurality of distinct parts.

6. The suction gripper head according to claim 4, wherein the frame forms a closed outline.

7. The suction gripper head according to claim 2, wherein at least one of the stiffener elements is a spacer or acts as a spacer, being fastened at each of its ends to two other stiffener elements.

8. The suction gripper head according to claim 2, comprising a suction block connected to the outlet orifice, the suction block being arranged at least in part inside the foam body.

9. The suction gripper head according to claim 2, wherein the head is an area gripper head.

10. The suction gripper head according to claim 2, wherein the suction block and/or a sound attenuation module is/are arranged at least in part inside the foam body.

11. The suction gripper head according to claim 2, wherein the soleplate is fastened, at least in part, directly to a bottom face of the foam body.

12. The suction gripper head according to claim 2, wherein the foam body is shaped in such a manner that the suction path is subdivided in its bottom portion into a plurality of channels with or without balls and/or calibrated holes opening out in register with respective ones of cells of the soleplate.

* * * * *